United States Patent
Cierullies et al.

(10) Patent No.: US 6,788,419 B2
(45) Date of Patent: Sep. 7, 2004

(54) DETERMINATION OF PROPERTIES OF AN OPTICAL DEVICE

(75) Inventors: Jens Cierullies, Boeblingen (DE); Ernst Brinkmeyer, Buchholz (DE)

(73) Assignee: Agilent Technologies, Inc., Palo Alto, CA (US)

( * ) Notice: Subject to any disclaimer, the term of this patent is extended or adjusted under 35 U.S.C. 154(b) by 89 days.

(21) Appl. No.: 10/059,703

(22) Filed: Jan. 29, 2002

(65) Prior Publication Data

US 2002/0191190 A1 Dec. 19, 2002

(30) Foreign Application Priority Data

Jun. 7, 2001 (EP) .............................. 01113887

(51) Int. Cl.[7] .......................... G01B 9/02; G01N 21/00
(52) U.S. Cl. ...................... 356/477; 356/73.1
(58) Field of Search ........................ 356/73.1, 450, 356/477, 491; 250/227.19, 227.27

(56) References Cited

U.S. PATENT DOCUMENTS 4,556,314 A  12/1985  Stone .................... 356/73.1
6,532,073 B2 * 3/2003  Ge ........................ 356/512
6,606,158 B2 * 8/2003  Rosenfeldt et al. ...... 356/477

FOREIGN PATENT DOCUMENTS

WO    WO 98/36252    8/1998

OTHER PUBLICATIONS

Zafiropoulos, N., Examiner. European Search Report, Application No. EP 01 11 3887, dated Dec. 6, 2001.

* cited by examiner

Primary Examiner—Samuel A. Turner
Assistant Examiner—Michael A. Lyons (57) ABSTRACT

A method of determination of a property of an optical device under test includes using a first initial coherent light beam, changing a first initial property of the first initial light beam, coupling the first initial light beam to the device under test, detecting a first signal of the first initial light beam received from the device under test, and correcting any a non-linearity in the first signal by interpolating the first signal on a linear scale.

36 Claims, 8 Drawing Sheets

FIG. 1

PRIOR ART

DETERMINATION OF PROPERTIES OF AN OPTICAL DEVICE

BACKGROUND OF THE INVENTION

1. Field of the Invention

The present invention relates to the determination of properties of an optical device under test, e.g. the determination of the group delay of the optical device. The group delay is a fundamental property of optical devices, such as single mode optical fibers or optical components such as Bragg gratings which devices are used in the optical transmission of information.

2. Discussion of the Background Art

As for the background of optical transmission of data it has to be said that the premier feature of optical fiber is its extremely low loss. This has made it the dominant transmission medium for long link lengths. The loss characteristics of fiber determines were optical communication is practical. At 1550 nanometer single mode optical fiber has an attenuation of 0.2 dB/km. This allows fiber optic signals to be propagated through very long length of fiber without regeneration. Telecommunication systems use the 1300 and 1550 nm windows for lowest loss in the fiber. Since a telecommunication system must cover a very large distance, the aforementioned attenuation of the single strength in the fiber is of high importance. Therefore, the loss characteristics of optical fiber often limit the distance that a signal can propagate in the fiber.

However, this is not always the case. In single mode fibers, chromatic dispersion can limit the distance over which fiber optic signals can propagate. Chromatic dispersion describes the fact that the speed of signal propagation in the fiber depends on the wavelength of the light. The consequence is that as the signal propagates through a long length of fiber, the edges of the waveform of the signal start to become more rounded. Eventually, the adjacent bits start to overlap in time causing the digital waveform to have poor readability. The amount of signal rounding depends beyond other parameters on the amount of chromatic dispersion in the cable. The problem of this pulse spreading is a problem in today's fiber communication because the increasing bit rate of the state of the art fiber communication systems, which bit rate reaches numbers of up to 40 Gbit/s per channel, brings the chromatic dispersion in the range of the bit resolution of such a 40 Gbit/s communication system.

Figure 1:
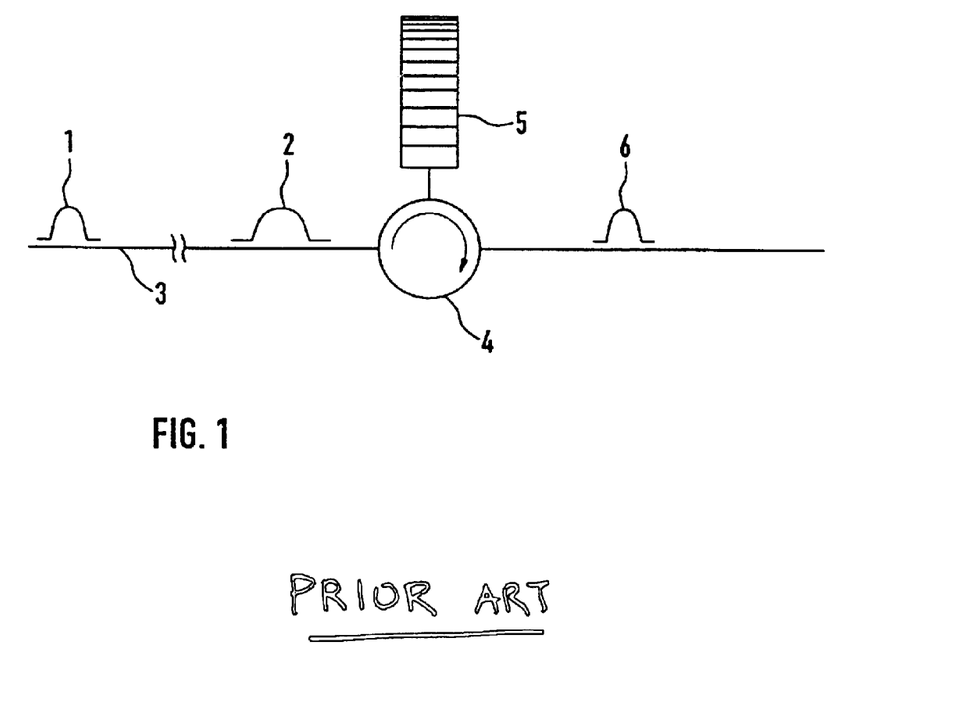
FIG. 1 shows a chirped Bragg grating in a light path.

To compensate chromatic dispersion in a fiber chirped Bragg gratings were developed. In these gratings different wavelengths of the pulse need different amounts of time traveling through the grating to compensate the dispersion caused by the fiber. The concept of this compensation is schematically illustrated in FIG. 1. FIG. 1 shows the original pulse 1 that is broadened to a spreaded pulse 2 while traveling through a fiber 3. With the help of a circulator 4 a chirped Bragg grating 5 is introduced in the path of the pulse 2. As described before the resulting pulse 6 has the original shape of pulse 1 again.

However, to use such a component as a chirped Bragg grating it is necessary to have exact knowledge of the chromatic dispersion caused by such a grating. The measurement of chromatic dispersion is accomplished by analyzing the group delay through the fiber as a function of wavelength. To measure the group delay a wavelength tunable optical source such as a tunable laser is used to generate coherent light at different wavelengths. In the prior art the wavelength of the tunable laser is then incremented step by step and for each wavelength step a group delay is determined. Finally, the group delay details are used to calculate the chromatic dispersion coefficient. The disadvantage of measuring the group delays step by step is the time, which is needed to perform all the wavelength steps and the respective measurements. In other words this means it takes quite a long time to get data, which are so precise that this precision is sufficient for the needs of the telecommunication industry.

SUMMARY OF THE INVENTION

Therefore, it is an object of the invention to provide an improved determination of a property of an optical device under test, e.g. the group delay of the optical device. The object is solved by the independent claims.

The main advantage of the present invention is that it is possible to measure the group delay and therefore the chromatic dispersion of an optical device, such as a fiber or a chirped Bragg grating, in a short amount of time while still keeping the precision of the data high enough for the needs of the telecommunication industry. This goal is reached by the invention by tuning the frequency of the coherent light beam of the laser from a maximum to a minimum of a given frequency range in a given time interval, e.g. making a wavelength sweep through the given wavelength range. Because of the inventive correction of effects caused by a non-linearity in the tuning of the laser this sweep can be done without detrimental broadening of the resulting spectral width. Method and apparatus of the invention avoid the aforementioned problems of the prior art and provide for exact data well keeping the measurement time low.

In a preferred embodiment of the invention there is performed a filtering of the Fourier transformed first signal with a high pass filter. It is further preferred to use a Hanning window as a shape for the high pass filter. Using this filter makes sure that a good elimination of not usable data is possible while still having important parts of data at the edges of the spectrum within the filter. Moreover, it is preferred to use a half of a Hanning window as a shape for the high-pass filter.

In a further preferred embodiment of the invention this high pass filter is adapted to the precision and the shape of the resulting spectrum of the signal corrected for a non-linearity of the laser by making an interferometric signal out of the corrected first phase signal, Fourier transforming the interferometric signal to get a spectral signal, determining a fraction of the maximum of the spectral signal, determining the abscissas of the intersections of the ordinate of the fraction which the curve of the spectral signal, determining the mean frequency $f_{mean}$ as the average of the abscissas, band pass filtering the spectral signal with a band pass filter having its center at the mean frequency and having a width greater than the width of the frequency range. The inventive concept of adaptive filtering of the signal corrected for a non-linearity of the laser is doubling the inventive success since by eliminating the non-linearity the resulting peak of the Fourier transformed spectrum is very sharp so that it can be used a filter width which is very much smaller than known filter width in the prior art. As can be seen in the following detailed description of the invention and the respective drawings this inventive concept is resulting in very smooth curves showing the group delay.

In a preferred embodiment the inventive method comprises the following steps:

splitting the first initial light beam into a first light beam and a second light beam, coupling the first light beam into the optical device under test, letting the second light beam travel a different path as the first light beam, superimposing the first and the second light beam to produce interference between the first light beam and the second light beam in a resulting first superimposed light beam, detecting as a first signal the power of the first superimposed light beam as a function of time when tuning the frequency of the coherent light beam from a minimum to a maximum of a given frequency range in a given time interval, splitting the second initial light beam in a third light beam and a fourth light beam, superimposing the third light beam and the fourth light beam after each light beam has traveled a different path, to produce interference between the third and the fourth light beam in a resulting second superimposed light beam, detecting as a second signal the power of the resulting second superimposed light beam as a function of time when tuning the frequency of the coherent light beam from a maximum to a minimum of a given frequency range in a given time interval, using the detected second signal for deriving a non-linearity information about a non-linearity in a tuning gradient of the frequency when tuning the frequency of the coherent light beam from the maximum to the minimum of the given frequency range, and using the non-linearity information for correcting effects on the first signal caused by the non-linearity to get a corrected first signal.

It is further preferred to flatten the first and/or the second signal before transforming it by approximating it with polynoms of at least second order.

Additionally it is preferred to tune the frequency with a tuning velocity of about 5 nm/s.

Additionally it is preferred to tune the frequency within a tuning interval of about c/1400 nm to c/1600 nm, c=velocity of light.

Additionally it is preferred to detect the power at a rate of about 100 kHz.

The term "coherent" in this application means that the coherence length of the light beam is bigger than the difference of the path of the first and second and third and fourth light beams, respectively.

Other preferred embodiments are shown by the dependent claims.

It is clear that the invention can be partly or entirely embodied or supported by one or more suitable software programs, which can be stored on or otherwise provided by any kind of data carrier, and which might be executed in or by any suitable data processing unit.

BRIEF DESCRIPTION OF THE DRAWINGS

Other objects and many of the attendant advantages of the present invention will be readily appreciated and become better understood by reference to the following detailed description when considering in connection with the accompanied drawings. The components in the drawings are not necessarily to scale, emphasis instead being placed upon clearly illustrating the principles of the present invention. Features that are substantially or functionally equal or similar will be referred to with the same reference sign(s).

DETAILED DESCRIPTION OF THE INVENTION

Figure 2:
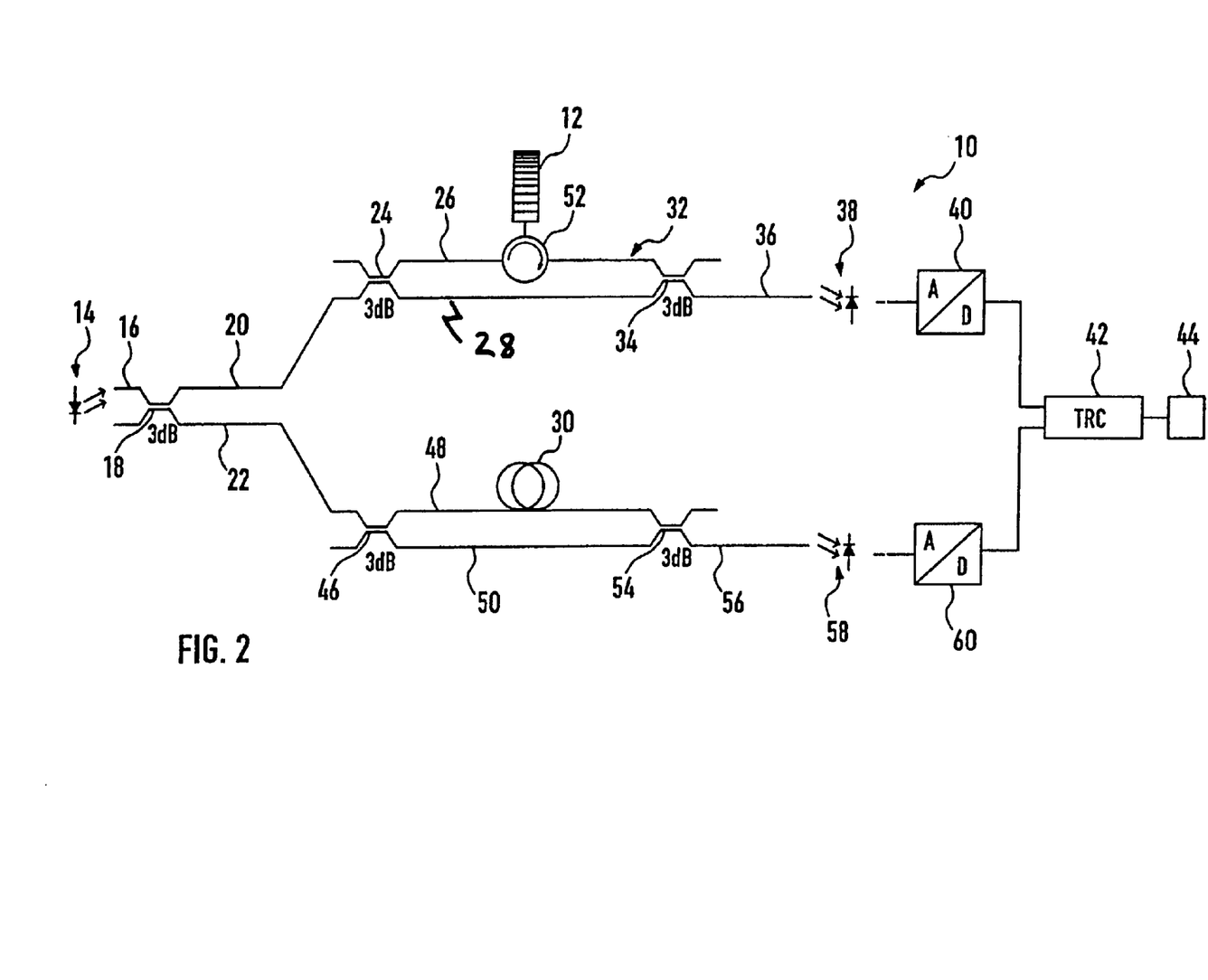
FIG. 2 shows an embodiment of the invention.

Referring now in greater detail to the drawings, FIG. 2 shows a schematic illustration of a preferred embodiment of an apparatus 10 for interferometric determination of the group delay of a chirped Bragg grating 12 as a device under test. However, with the present invention it is possible to determine optical properties, e.g. the group delay of other devices, e.g. fibers or even air, also.

The apparatus 10 comprises a tunable laser 14 as a signal source for a coherent laser beam 16, wherein the laser 14 is tunable between 1400 nm and at most 1600 nm. The tunable laser 14 can be tuned continuously within a given frequency range in a given time interval. The laser beam 16 is coupled into a first beam splitter 18, which splits the coherent laser beam 16 in a first initial beam 20 and a second initial beam 22. The first initial beam 20 is coupled into a second beam splitter 24. With the help of the second beam splitter 24 the first initial beam 20 is split into a first beam 26 and a second beam 28. The first beam 26 is traveling a different and longer path than the second beam 28, since the first beam 26 is coupled via a circulator 52 into the grating 12. Reflected by the grating 12 the first beam 26 is coupled via the circulator 52 in the first path 32 of the first beam 26 again. Then the first beam 26 and the second beam 28 are united with a third beam splitter 34 by superimposing the first beam 26 and the second beam 28 to a first resulting beam 36. The first resulting beam 36 is coupled into a first photodiode 38. The photodiode 38 transmits its output as a first signal to an analog/digital-converter (ADC) 40 (which can be National Instruments AD-MIO-16DE-10). The ADC 40 is connected to a transient recorder 42 that can be a FAST TR1202 of Fast Comtec GmbH, Germany. The laser 14 can be a HP81680A of the applicant. The transient recorder 42 is coupled to a computer 44 as an evaluation unit of apparatus 10.

Second beam splitter 24, first beam 26, second beam 28 and third beam splitter 34 built up a first Mach-Zehnder-interferometer.

Exiting the first beam splitter 18 is a second initial beam 22. A fourth beam splitter 46 splits the second initial beam 22 into a third beam 48 traveling a third path and a fourth beam 50. The third beam 48 is traveling a different and longer path than the fourth beam 50, wherein the path length of the third path differs from the path length of the fourth path by more than 1 m, preferred by less than 20 m, more preferred by less than 9 m, even more preferred between 7 and 9 m. This different path is symbolized by some loops 30. The third 48 and the fourth 50 beam are coupled into a fifth beam splitter 54 which units the third beam 48 and the fourth beam 50 to a superimposed second resulting beam 56. The second resulting beam 56 is then coupled into a second photodiode 58. The second photodiode 58 transmits its output as a second signal to an analog/digital converter ADC 60, similar to the ADC 40. The ADC 60 is also connected to the transient receiver 42. Fourth beam splitter 46, third beam 48, fourth beam 50 and fifth beam splitter 54 built up a second Mach-Zehnder interferometer.

The system for determination of the group delay of the optical component 12 according to the present invention is based on the use of aforementioned Mach-Zehnder interferometers, both of which are supplied with light of the same light source 14. It is necessary to make the determination by interferometric measurements since the phase characteristics of the component 12 can not be detected directly.

The calculation of the properties based on the detected first and second signals is as follows:

The laser 14 emits light 16 with field strength E dependent on the time t according to the following formula:

$$E_{Laser}(t) = E_0 \cdot \exp\left(j \cdot 2\pi \int_0^t v_{mom}(t')\,dt'\right) \text{ with} \quad (3.1)$$

$$v_{mom} = \frac{1}{2\pi}\frac{d\phi}{dt} \quad (3.2)$$

into the Mach-Zehnder interferometers, $v_{mom}$ denoting the instantaneous frequency of the laser 14.

In the embodiment of FIG. 2 the frequency of the laser 14 is changed in a linear way so that the instantaneous frequency is $$v_{mom}(t) = v_0 + \gamma \cdot t \quad (3.3)$$

To calculate as a second signal the power of the resulting signal 56 of the second Mach-Zehnder interferometer detected with the second detector 58, one puts for the detected voltage $U_{det}$ that the light of the longer path is delayed by $\tau = \Delta L \cdot n/c$ when arriving at the fifth beam splitter 54. n is the refractive index of the medium, $\Delta L$ is the difference of the path length and c is the velocity of light.

The detected voltage is determined by the two superimposed fields that travel through the different paths of the interferometer:

$$U_{det}(t) \sim |E_{Laser}(t) + E_{Laser}(t+\tau)|^2 \quad (3.4)$$

$$= \left|\exp\left(j \cdot 2\pi \int_0^t v_{mom}(t')\,dt'\right) + \exp\left(j \cdot 2\pi \int_0^{t+\tau} v_{mom}(t')\,dt'\right)\right|^2$$

$$= 2\left[1 + \cos\left(2\pi \int_0^{t+\tau} v_{mom}(t')\,dt' - 2\pi \int_0^t v_{mom}(t')\,dt'\right)\right]$$

$$= 2\left[1 + \cos\left(2\pi \int_t^{t+\tau} v_{mom}(t')\,dt'\right)\right]$$

Only regarding of the changing part of this signal and putting $\Gamma = \int v(t)\,dt$ the result is:

$$U_{det}^{\sim}(t) = 2 \cdot \cos\,[2\pi \cdot (\Gamma_{mom}(t+\tau) - \Gamma_{mom}(t))]. \quad (3.5)$$

Assuming $\tau \ll t$ and approximating with differential quotient one reaches:

$$U_{det}^{\sim}(t) = 2 \cdot \cos\left[2\pi \cdot \frac{\Gamma_{mom}(t+\tau) - \Gamma_{mom}(t)}{\tau} \cdot \tau\right] \quad (3.6)$$

$$= 2 \cdot \cos\left[2\pi \cdot \underbrace{\overline{v}_{mom}(t)}_{v_{mom}\text{average over } \tau} \cdot \tau\right] \quad (3.7)$$

The second signal of the second interferometer is therefore ideally, i.e. with a linear rise in frequency of the laser 14 over time a cosine, the frequency of which is determined by the length $\Delta L$ and the sweep velocity of the wavelength over time.

Because the laser 14 will produce not an ideal sweep over the given frequency range and will produce non linearities in this sweep one can expect a cosine which has a frequency which is changing over time. With this second signal it is possible according to the present invention to correct the first signal of the first interferometer for this non-linearities in therefore getting a resulting corrected first signal as if the laser 14 had performed a linear sweep.

In the first interferometer in which the grating 12 is incorporated the group delay of this grating 12 is determined. For this purpose as the first signal the detected power of the first photodiode 38 is calculated in an analog way as explained above. However, in the following the first signal is only determined in its dependency of the optical frequency $v$, where as the time dependency is determined later on.

For the detected signal at the photodiode 38 the following formula applies:

$$U_{det}(v) \sim |\exp(-j \cdot \beta_{DUT}(v) \cdot L_{DUT}) + \exp(-j \cdot \beta(v) \cdot L)|^2 \quad (3.8)$$

$$= 2[1 + \cos(\beta_{DUT}(v)L_{DUT} - \beta(v)L)]$$

Whereas $\beta$ is the phase constant of the second path, whereas $\beta_{DUT}$ is the phase constant of the first path through the grating 12. In this formula the fact is neglected that the grating 12 can have a reflection coefficient smaller than one. However, this has no importance for the changing part of the detected signal 36. For this changing part it can be written with $\phi = \beta \cdot L$:

$$U_{det}^{\sim}(v) = 2 \cdot \cos\,(\phi_{DUT}(v) - \phi(v)) \quad (3.9)$$

Hilbert-transforming this signal gives the analytic signal:

$$\hat{U}_{det}^{\sim}(v) = 2 \cdot \exp\,(\phi_{DUT}(v) - \phi(v)) \quad (3.10)$$

and the phase information:

$$\phi_{det}(v) = \phi_{DUT}(v) - \phi(v) \quad (3.11)$$

To determine the time dependency of the signal when performing a frequency sweep of the laser 14 and to find an evaluation rule for the group delay $\tau_{g,DUT}$, the functions $\phi$ and $\phi_{DUT}$ are now examined.

For the phase of the path of the beam 28 without the grating 12 which path is assumed to be dispersion free it is possible to perform a Taylor approximation of the first order:

$$\phi(v) = \phi(v_0) + \frac{d\phi}{dv}\bigg|v = v_0 \cdot (v - v_0) \quad (3.12)$$

$$= \phi(v_0) + 2\pi \frac{d\phi}{d\omega}\bigg|\omega = \omega_0 \cdot (v - v_0)$$

$$= \phi(v_0) + \tau(v_0) \cdot 2\pi(v - v_0)$$

$$= \phi(v_0) + \frac{2L \cdot n(v_0)}{c} \cdot 2\pi(v - v_0)$$

where L is the length of the path without the grating 12.

The same goes for the path 32 of the beam 26 with the grating 12:

$$\phi_{DUT}(v) = \phi_{DUT}(v_0) + \frac{d\phi_{DUT}}{dv}|v = v_0 \cdot (v - v_0) + \quad (3.13)$$

$$\frac{1}{2} \frac{d^2 \phi_{DUT}}{dv^2}|v = v_0 \cdot (v - v_0)^2 + \Psi,$$

where $\Psi$ is denoting the residual error. Performing the same steps as in formula 3.12 one reaches the following formula:

$$\phi_{DUT}(v) = \phi_{DUT}(v_0) + \tau_{DUT}(v_0) \cdot 2\pi(v - v_0) + \quad (3.14)$$

$$\frac{1}{2} \frac{d}{dv}(\tau_{DUT}(v))|v = v_0 \cdot 2\pi(v - v_0)^2 + \Psi$$

with $$\frac{d\tau_{DUT}}{dv} = \frac{d\tau_{DUT}}{d\lambda} \cdot \frac{d\lambda}{dv} = \frac{d\tau_{DUT}}{d\lambda} \cdot \frac{1}{\frac{d}{d\lambda}\left(\frac{c}{\lambda}\right)} = -\frac{d\tau}{d\lambda} \cdot \frac{\lambda^2}{c}. \quad (3.15)$$

By putting this formula into 3.11 this gives for the phase of the analytic signal:

$$\phi_{det} = \phi_{DUT}(v_0) - \phi(v_0) + 2\pi[\tau_{DUT}(v_0) - \tau(v_0)] \cdot (v - v_0) - \quad (3.16)$$

$$\frac{d\tau}{d\lambda}|\lambda_0 \cdot \frac{\lambda^2}{c}\pi(v - v_0)^2 + \Psi$$

$$= \Delta\phi_0 \quad (3.17)$$

$$+ 2\pi\Delta\tau_0 \cdot (v - v_0) \quad (3.18)$$

$$-\frac{d\tau}{d\lambda}|\lambda_0 \cdot \frac{\lambda^2}{c}\pi(v - v_0)^2 \quad (3.19)$$

$$+\Psi \quad (3.20)$$

To determine the group delay of the grating 12 it is sufficient to differentiate the face $\phi_{det}$ with respect to $\omega$. This gives:

$$\frac{d\phi_{det}}{d\omega} = \frac{1}{2\pi} \cdot \frac{d\phi_{det}}{dv} = \frac{1}{2\pi} \cdot \left[\frac{d\phi_{DUT}}{dv} - \frac{d\phi}{dv}\bigg|_{const}\right] \quad (3.21)$$

This is the information searched for since only the behavior of the group delay with respect to the frequency is interesting, rather than an absolute value.

However, it is easy to extract from formulas 3.17–3.20 information about a deviation of this linear rise of the group delay with respect to the wavelength for gratings with linear chirp. This goes by approximating the measured phase signal with a polynomial of second order and subtracting this polynomial of the phase signal. After this only the part 3.20 remains which represents the deviation of the group delay with respect a linear chirp grating.

Figure 3:
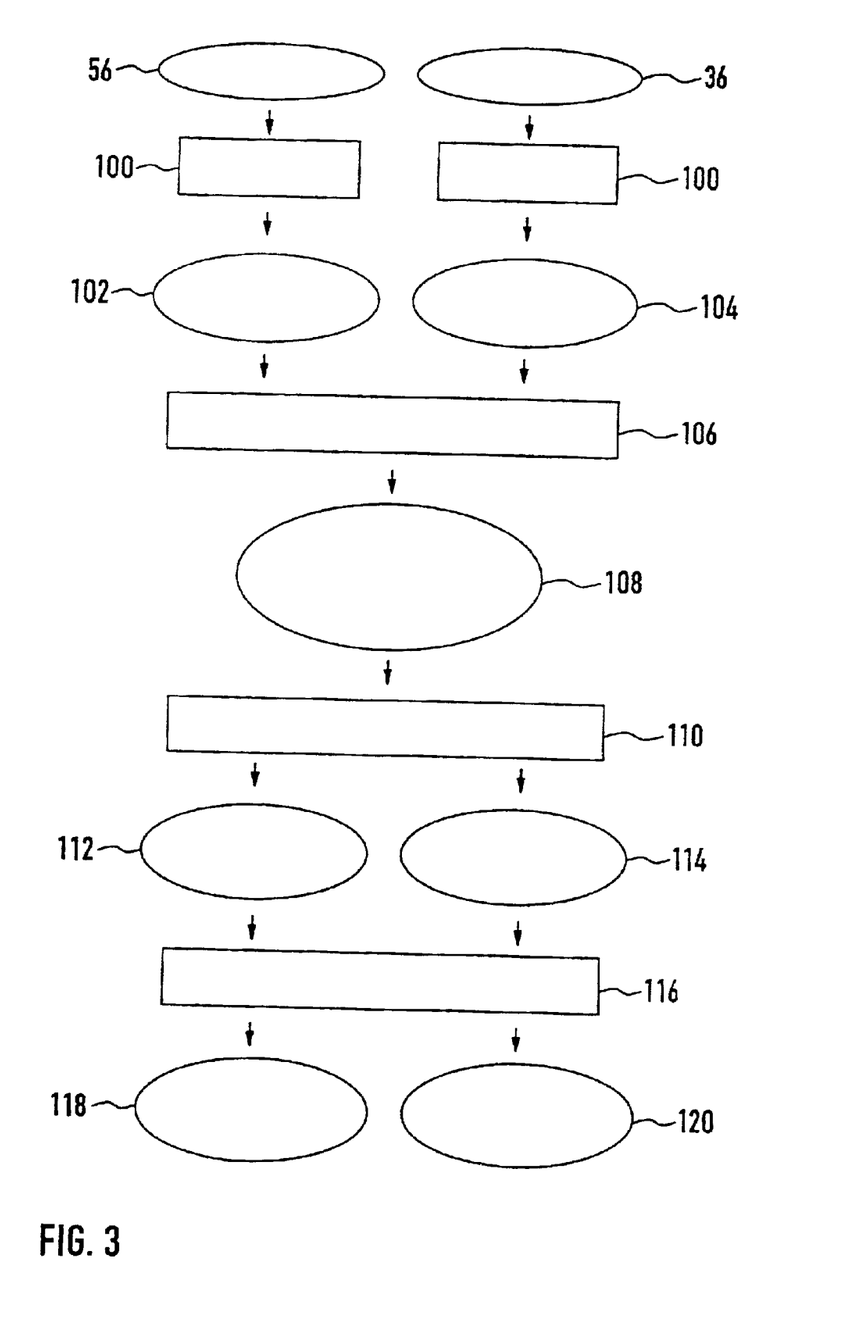
FIG. 3 shows a flow chart of the steps of an embodiment of the inventive method.

With the help of the diagram of FIG. 3 the main steps of an embodiment of the inventive method are described, whereas some more details of these steps follow later on:

In FIG. 3 ovals describe signals and boxes describe measures of the evaluation unit 44. First of all the second or reference signal 56 and the first signal 36 are towed to the zero line in step 100 (see FIG. 4). The resulting signals 102 and 104 are now oscillating about the zero line. In step 106 any non-linearities in the sweep of the laser 14 are corrected with the help of the second signal 56 (see FIG. 5). Resulting is a signal 108 corrected for any non-linearities in the laser sweep. With the help of the aforementioned formulas are evaluated in step 110 the group delay 112 and the linear deviation of linear chirp 114.

With the help of a filter step 116 it is possible to get filtered signals 118 and 120 of the group delay and of the deviation from the linear chirp of the grating 12.

Figure 4:
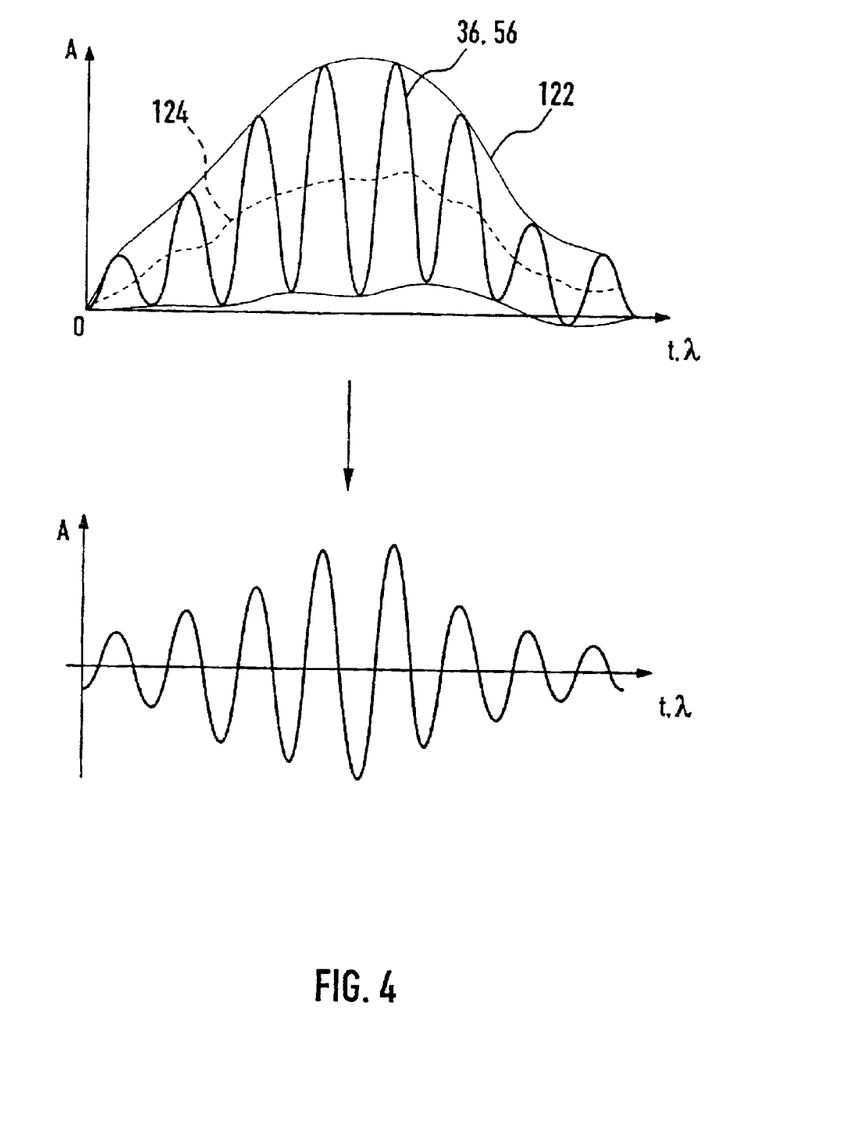
FIG. 4 shows an illustration of the step 100 of FIG. 3.

In FIG. 4 the principle of the function 100 is graphically illustrated. A is the amplitude of the signals 36 and 56.152 denotes the reflection spectrum of the grating 12. 124 denotes the ideal center line of the spectrum 122.

Figure 8:
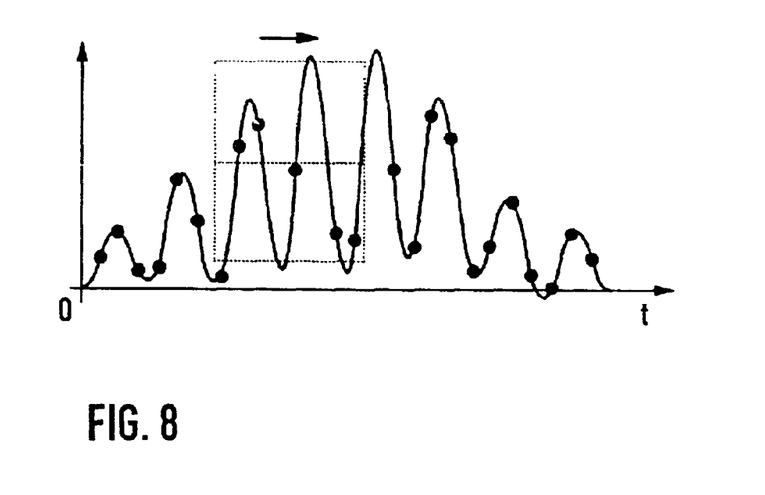
FIG. 8 shows an illustration of the step 100 of FIG. 3.

The function 100 is illustrated in FIG. 8 and comprises the following steps:
  making the signal 36, 56 oscillating about a zero line by:
  determining the points of mean value of the signal 36, 56 by:
  determining the maximum and the minimum of the signal 36, 56 in a predetermined first range of time smaller than the total range of time,
  determining a mean value between the maximum and the minimum,
  determining the maximum and the minimum of the signal 36, 56 in a predetermined next range of time adjacent the already examined range of time,
  determining a mean value between the maximum and the minimum,
  repeating the last two steps until the complete time interval is covered,
  choosing the predetermined range of time by:
  determining the average period of the oscillations of the signal 36, 56,
  choosing the size of the range so that more than two average periods fit in the chosen range of time.

Figure 5:
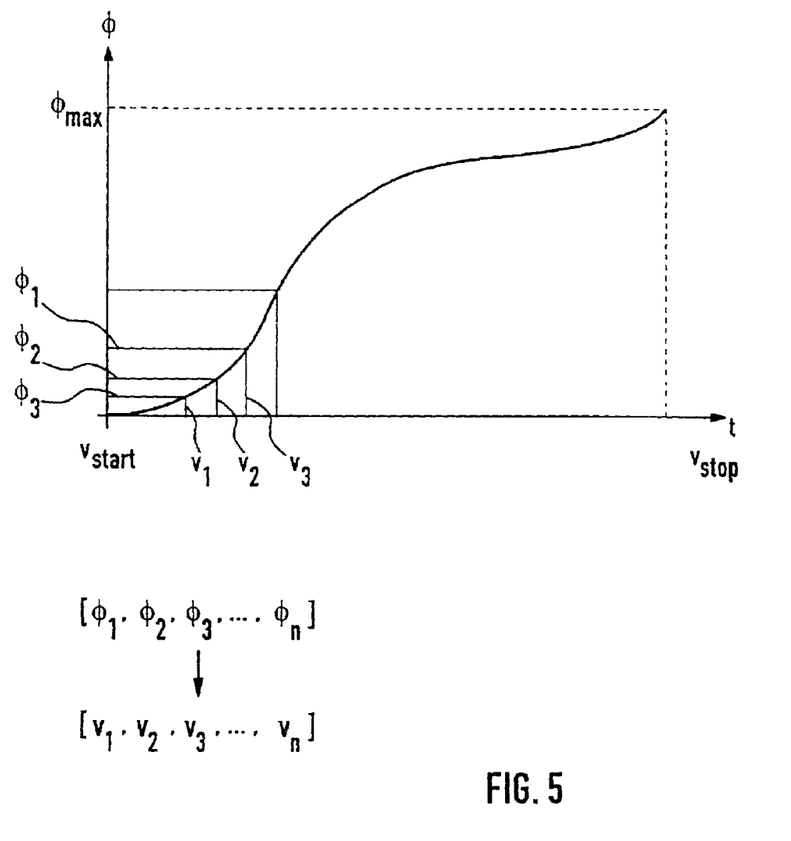
FIG. 5 shows an illustration of the step 106 of FIG. 3.

FIG. 5 illustrates a part of the function of step 106 to correct unwitting non-linearities in the sweep of the laser 14. The step 106 comprises the following steps (in the following the symbol "f" is used instead of "v"):
  deriving the non-linearity information by:
  transforming the second signal 56 to get a Fourier transformed second signal,
  eliminating the negative parts of the Fourier transformed second signal to get a non-negative Fourier transformed second signal,
  retransforming the non-negative Fourier transformed second signal to get an analytic signal of the second signal 56,
  determining the phase of the analytic signal to get as a second phase signal the phase as a function of time of the second signal 56,
  using the second phase signal for determining as the non-linearity information the frequency as a function of time of the second signal 56,
  deriving a first phase signal by:
  transforming the first signal 36 to get a Fourier transformed first signal,
  eliminating the negative parts of the Fourier transformed first signal to get a non-negative Fourier transformed first signal,
  retransforming the non-negative Fourier transformed first signal to get an analytic signal of the first signal 36,
  determining the phase of the analytic signal to get as a first phase signal as a function of time of the first signal,
  correcting the effects on the first signal 36 caused by the non-linearity by:
  using the non-linearity information to interpolate the first phase signal of the first signal 36 on a linear scale of frequencies to get a corrected first phase signal, For determining the non-linearity information the following steps are performed:
  determining the frequency f(n) of the second signal 56 as a function of n discrete points of time, n=1, . . . , N, on the basis of the second phase signal by:

determining the second phase signal φ(n) at the n points of time, determining the maximum $\phi_{max}$ of the second phase signal, using a predetermined maximum frequency $f_{max}$ of the frequency range, a predetermined average tuning velocity during tuning the frequency and the maximum $\phi_{max}$ of the second phase signal to determine for each of the n points of time the frequency f(n) according to the formula: $f(n)=[(f_{max}-f_{min})/\phi_{max}]\phi(n)$, For the interpolating step, the following sub-steps are performed:

getting the linear scale $f_{lin}(n)$ of frequencies by:

using the predetermined maximum frequency $f_{max}$ of the frequency range and the predetermined minimum frequency $f_{min}$ of the frequency range to determine the linear scale $f_{lin}(n)$ of frequencies according to the formula: $f_{lin}(n)=[(f_{max}-f_{min})/(N-1)]n$.

preferably sorting the absolute values of f(n) monotonically, using f(n) for interpolating the first phase signal of the first signal 36 on the linear scale of frequencies $f_{lin}(n)$. The interpolation can be done linearly or with the help of polynoms or splines.

The resulting signal 108 which is corrected for any non linearities in the sweep of the laser 14 is used in step 110 for evaluate the group delay 112 and the deviation 114 from the linear chirp of the grating 12. This evaluation is done with the help of the above-mentioned mathematical formulas and can comprises deriving a group delay 112 of the optical device under test 12 by differentiating the compensated first phase signal with respect to the frequency.

The method can further comprise the following steps:

ignoring at the begin of the tuning a predetermined amount of values of the corrected first phase signal to eliminate teething troubles out of the corrected first signal 108, approximating the group delay 112 with polynoms of at least second order to get an approximated group delay, subtracting the approximated group delay from the group delay 112 to get a non-linear part of the group delay 112.

using the non-linear parts of the group delay 112 to determine the mean signal power of a deviation from a linear of the group delay 112 of the device under test 12.

using the square coefficient of the polynomial to determine the mean gradient of the group delay 112.

Having evaluated the group delay 112 and the deviation 114 it is possible but not necessary to make a filter step 116 to filter the signals 112, 114. Actually, this filter step is preferably performed before the calculating of the group delay 112, as follows:

adapting the filtering to the shape of the corrected first signal 108 by:

a: making an interferometric signal out of the corrected first phase signal, b: Fourier transforming the interferometric signal to get a spectral signal, c: determining a fraction, preferred the half, of the maximum of the spectral signal, d: determining the abscissas of the intersections of the ordinate of the fraction with the curve of the spectral signal, e: determining the mean frequency $f_{mean}$ as the average of the abscissas, f: band-pass filtering the spectral signal with a band-pass filter having its center at the mean frequency and having a width greater than the width of the frequency range, determining the width of the band-pass filter by:

a: predetermining or estimating the maximal range $GD_{range}$ of the group delay, b: determining the mean value $GD_{mean}$ of the group delay according to the steps c–e of claim 26, c: calculating the filter width according to the formula:

filter width=$f_{mean}(GD_{range}/GD_{mean})$, filtering with a filter having the shape of a Hanning window.

Resulting is a filtered group delay 118 and a filtered deviation 120.

Figure 6:
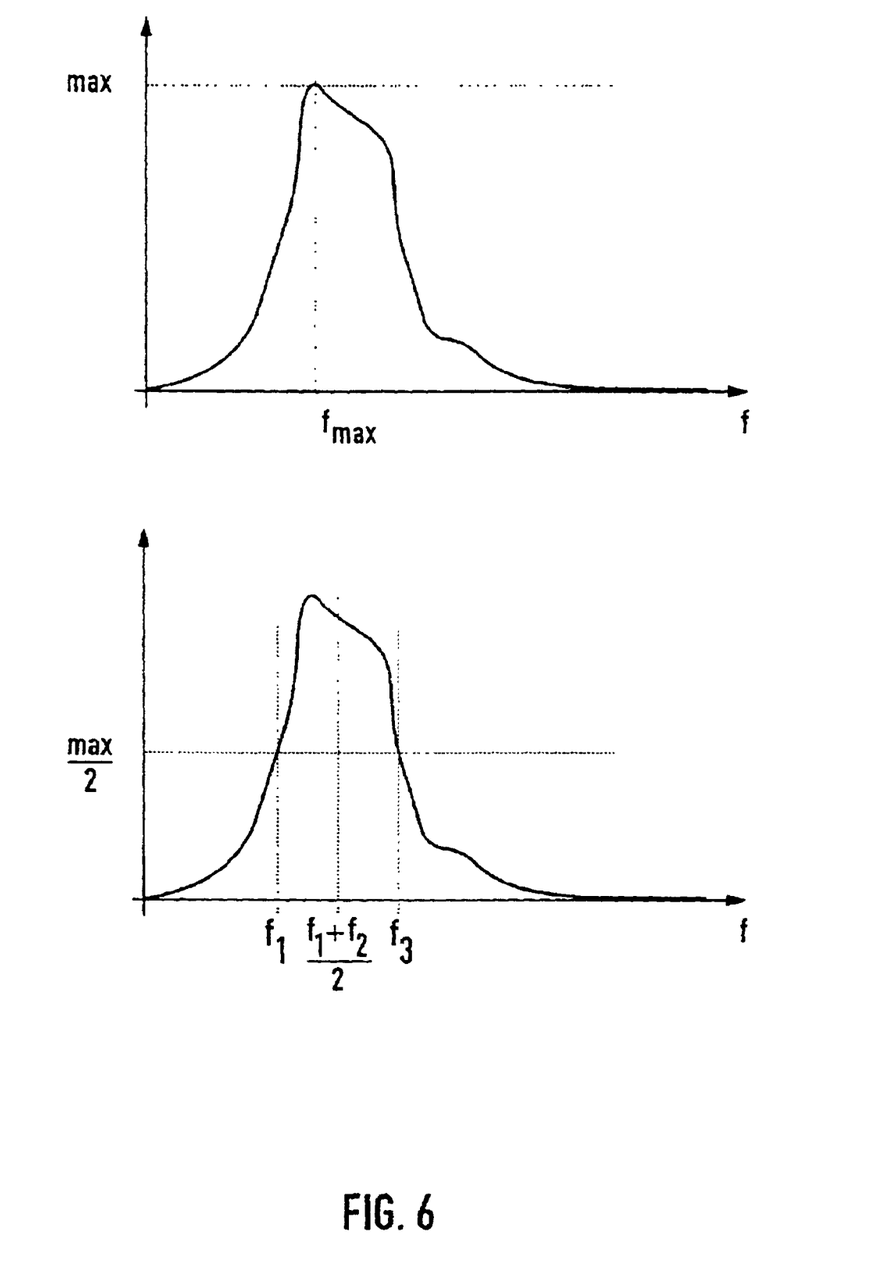
FIG. 6 shows an illustration of the step 116 of FIG. 3.

FIG. 6 shows the principle of determination of the center frequency $f_{mean}$ of the interferometric spectrum.

Figure 7:
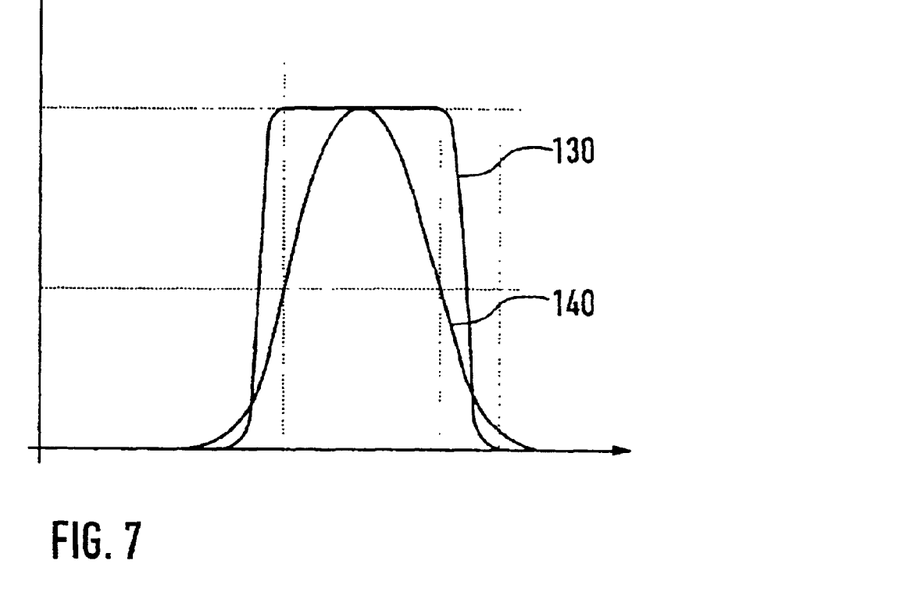
FIG. 7 shows two possible shapes for filters used in step 116 of FIG. 3.
Figure 9:
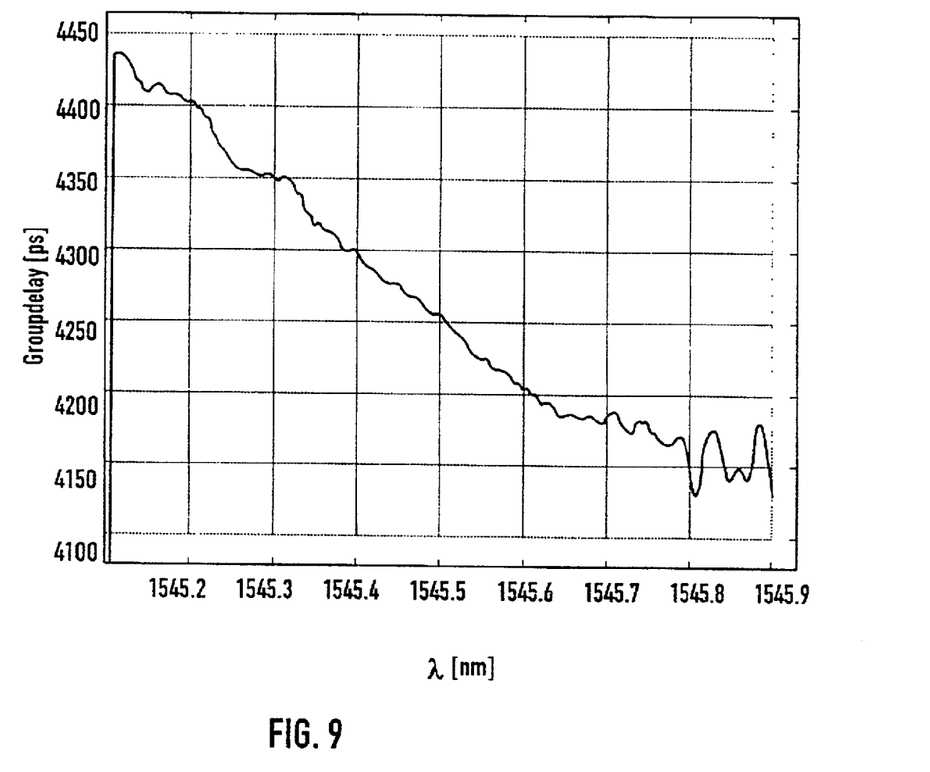
FIG. 9 shows the group delay of the grating 12 of the example of FIG. 1.

FIG. 7 shows a graph showing different filter shapes for use with the inventive method, a flat top filter shape 130 and a Hanning form filter shape 140. FIG. 9 shows the group delay 112 over wave length of a chirped Bragg grating 12, which is a FBGDC-HP1A of the company JDS Fitel. It is clearly seen that the graph of the group delay 112 is very smooth with respect to graphs determined with methods of the prior art.

What is claimed is:

1. A method of determining a property of an optical device under test, the method comprising:

using a first initial coherent light beam;

changing a first initial property of the first initial coherent light beam;

coupling the first initial coherent light beam to the device under test;

detecting a first signal of the first initial coherent light beam received from the device under test; and correcting a non-linearity in the first signal, the non-linearity being caused by a non-linearity in a change of the first initial property by interpolating the first signal on a linear scale.

2. The method of claim 1, further comprising:

using a second initial coherent light beam;

changing a second initial property of the second initial coherent light beam;

detecting a second signal of the second initial coherent light beam, without coupling the second initial coherent light beam to the device under test to discover a non-linearity in the second signal caused by a non-linearity in a change of the second initial property; and using the discovered non-linearity of the detected second signal to interpolate the first signal.

3. The method of claim 2, further comprising:

producing a coherent light beam; and splitting the coherent tight beam into a first initial light beam and a second initial light beam.

4. The method of claim 2, further comprising changing the first initial property substantially simultaneously with the second initial property.

5. The method of claim 2, wherein the first initial property and the second initial property are substantially the same initial property.

6. The method of claim 1, further comprising detecting the first signal substantially simultaneously with the second signal.

7. The method of claim 1, wherein the first initial property is a frequency of the coherent light beam.

8. The method of claim 7, further comprising the steps of:

transforming the first signal in a plurality of phase signals over a linear scale of a plurality of points of time;

transforming the second signal in a plurality of frequency signals over the plurality of points of time, the plurality of points of time being a plurality of linear scale of points of time to discover a non-linearity in the second signal, said non-linearity caused by a non-linearity in a change of the initial property, the initial property being the frequency of the coherent light;

assigning the transformed first signal to the transformed second signal; and interpolating the assigned transformed first signal on a linear scale of frequencies.

9. The method of claim 8, further comprising creating the linear scale of frequencies $f_{lin}(n)$ according to the formula $f_{lin}(n)=(f_{min}-f_{max})\times(n/N)$, n Element 1, ..., N, wherein N is the plurality of points of time.

10. The method of claim 8, further comprising deriving the non-linearity information by:

transforming the second signal to obtain a Fourier transformed second signal;

eliminating a plurality of negative parts of the Fourier transformed second signal to obtain a non-negative Fourier transformed second signal;

retransforming the non-negative Fourier transformed second signal to obtain an analytic signal of the second signal;

determining a phase of the analytic signal to obtain as a second phase signal the phase as a function of time of the second signal; and using the second phase signal for determining as the non-linearity information the frequency as a function of time of the second signal.

11. The method of claim 10, further comprising determining the frequency f(n) of the second signal as a function of n discrete points of time, wherein n=1, ..., N, on the basis of the second phase signal to determine the non-linearity information by:

determining the second phase signal $\phi(n)$ at the n points of time;

determining a maximum $\phi_{max}$ of the second phase signal; and using a predetermined maximum frequency $f_{max}$ of the frequency range, a predetermined average tuning velocity during tuning the frequency and the maximum $\phi_{max}$ of the second phase signal to determine for each of the n points of time the frequency f(n) according to the formula: $f(n)=[(f_{max}-f_{min})/\phi_{max}]\phi(n)$.

12. The method of claim 11, further comprising using f(n) for interpolating the first phase signal of the first signal on the linear scale of frequencies $f_{lin}(n)$.

13. The method of claim 7, further comprising deriving a first phase signal by:

transforming the first signal to obtain a Fourier transformed first signal;

eliminating the plurality of negative parts of the Fourier transformed first signal to obtain a non-negative Fourier transformed first signal;

retransforming the non-negative Fourier transformed first signal to obtain an analytic signal of the first signal; and determining the phase of the analytic signal to obtain as a first phase signal as a function of time of the first signal.

14. The method of claim 13, further comprising correcting effects on the first signal caused by the non-linearity by using the non-linearity information to interpolate the first phase signal of the first signal on a linear scale of frequencies to obtain a corrected first phase signal.

15. The method of claim 14, further comprising obtaining the linear scale $f_{lin}(n)$ of frequencies by:

using the predetermined maximum frequency $f_{max}$ of the frequency range and the predetermined minimum frequency $f_{min}$ of the frequency range to determine the linear scale $f_{lin}(n)$ of frequencies according to the formula: $f_{lin}(n)=[(f_{max}-f_{min})/(N-1)]n$; and sorting the absolute values of f(n) monotonically.

16. The method of claim 14, further comprising deriving a group delay of the optical device under test by differentiating the corrected first phase signal with respect to the frequency.

17. The method of claim 16, further comprising:

approximating the group delay with a polynomial of at least second order to get an approximated group delay, and subtracting the approximated group delay from the group delay to obtain a non-linear part of the group delay.

18. The method of claim 17, further comprising using the non-linear part of the group delay to determine a mean signal power of a deviation from a linear group delay of the device under test.

19. The method of claim 18, further comprising using a square coefficient of the polynomial to determine a mean gradient of the group delay.

20. The method of claim 16, further comprising filtering the corrected first signal before calculating the group delay.

21. The method of claim 20, further comprising adapting the filtering to the shape of the corrected first signal by:

making an interferometric signal, the interferometric signal being obtained from the corrected first phase signal;

Fourier transforming the interferometric signal to obtain a spectral signal;

determining a fraction of a maximum of the spectral signal;

determining an abscissas of intersections of the ordinate of the fraction with the curve of the spectral signal;

determining the mean frequency $f_{mean}$ as the average of the abscissas; and band-pass filtering the spectral signal with a band-pass filter having a center at the mean frequency and having a width greater than the width of the frequency range.

22. The method of claim 21, further comprising determining the width of the band-pass filter by:

predetermining or estimating a maximal range $GD_{range}$ of the group delay;

determining the mean value $GD_{mean}$ of the group delay by determining a fraction of the maximum of the spectral signal, determining the abscissas of the intersections of the ordinate of the fraction with the curve of the spectral signal; and determining the mean frequency $f_{mean}$ as the average of the abscissas; and calculating the filter width according to the formula: filter width=$f_{mean}(GD_{range}/GD_{mean})$.

23. The method of claim 22, further comprising:
  subtracting a gradient in the group delay from the group delay;
  predetermining the maximum range $GD_{range}$ of the group delay;
  determining the mean value $GD_{mean}$ of the group delay by determining a fraction of the maximum of the spectral signal, determining the abscissas of the intersections of the ordinate of the fraction with the curve of the spectral signal; and determining the mean frequency $f_{mean}$ as the average of the abscissas;
  calculating the filter width according to the formula: filter width=$f_{mean}(GD_{range}/GD_{mean})$,
  calculating the group delay; and
  adding the subtracted gradient to the calculated group delay.

24. The method of claim 14, further comprising ignoring at a commencement of a tuning a predetermined amount of values of the corrected first phase signal to eliminate a plurality of teething troubles from the corrected first signal.

25. The method of claim 14, further comprising:
  using the corrected first signal to calculate the corrected first phase signal versus frequency;
  filtering the corrected first phase signal by Hubert transforming the corrected first phase signal before filtering the corrected first phase signal to obtain a corrected signal to be filtered by detecting a change of a signal with time, the corrected first signal being the basis for deriving the property; and
  filtering the detected signal by transforming the detected signal to obtain a Fourier transformed signal;
  filtering the Fourier transformed signal with a filter to obtain a filtered Fourier transformed signal;
  retransforming the filtered Fourier transformed signal to obtain a filtered signal; and deriving the property on the basis of the filtered signal.

26. The method of claim 13, further comprising determining the points of mean value by:
  determining the maximum of the Fourier transformed signal of the first signal,
  using the maximum to determine a size of a high-pass filter, and
  filtering the Fourier transformed first signal with the high-pass filter.

27. The method of claim 7, further comprising at least one of the following:
  deriving a group delay of the optical device under test as a function of frequency from the corrected first signal; and
  deriving a chromatic dispersion coefficient of the optical device under test as a function of frequency from a corrected first signal.

28. The method of claim 1, further comprising:
  splitting the first initial coherent light beam into a first light beam and a second light beam;
  coupling the first light beam to the optical device under test;
  letting the second light beam travel to a different path relative to the first light beam;
  superimposing the first and the second light beam to produce interference, the interference being between the first light beam and the second light beam, the interference producing a resulting first superimposed light beam;
  detecting as a first signal a power of the first superimposed light beam as a function of time when tuning a frequency of the coherent light beam from a minimum to a maximum of a predetermined frequency range in a predetermined time interval;
  splitting the second initial light beam in a third light beam and a fourth light beam;
  superimposing the third light beam and the fourth light beam after each of the third and fourth light beams have each traveled a different path, the third light beam and the fourth light beam producing interference between the third and the fourth light beam in a resulting second superimposed light beam;
  detecting as a second signal a power of the resulting second superimposed light beam as a function of time when tuning the frequency of the coherent light beam from a maximum to a minimum of a predetermined frequency range in a predetermined time interval;
  using the detected second signal for deriving a non-linearity information about a non-linearity in a tuning gradient of the frequency when tuning the frequency of the coherent light beam from the maximum to the minimum of the predetermined frequency range; and
  using the non-linearity information for correcting an effect on the first signal caused by the non-linearity to obtain a corrected first signal.

29. The method of claim 1, further comprising deriving a property being selected from the group consisting of a transmissive property, a reflective property, and any combinations thereof of the optical device under test from a compensated first signal.

30. The method of claim 1, further comprising making the first signal oscillating about a zero line by:
  determining a plurality of points of mean value of the first signal;
  interpolating a curve through said plurality of points of mean value of the first signal; and
  subtracting plurality of points of mean value of the curve from the first signal to obtain a corrected first signal oscillating about the zero line.

31. The method of claim 30, further comprising determining the points of mean value by extracting points having a maximum gradient.

32. The method of claim 30, further comprising making the first signal oscillating about a zero line by determining the plurality of points of mean value of the first signal by:
  (a) determining a maximum and a minimum of the first signal in a predetermined first range of time, the predetermined first range of time being less than a total range of time;
  (b) determining a mean value between the maximum and the minimum;
  (c) determining the maximum and the minimum of the first signal in a predetermined second range of time being adjacent the examined predetermined first range of time;
  (d) determining a mean value between the maximum and the minimum; and
  (e) repeating steps (c) and (d) until the total range of time is covered.

33. The method of claim 32, further comprising the step of selecting the predetermined first range of time by:
  determining an average period of the oscillations of the first signal; and
  choosing a size of the range so that more than about two average periods fit in the chosen range of time.

34. A method of determining a property of an optical device under test, comprising:
- detecting a change of a signal with time, the detected signal being the basis for deriving the property; and
- filtering the detected signal by:
- transforming the detected signal to get a Fourier transformed signal;
- filtering the Fourier transformed signal with a filter to obtain a filtered Fourier transformed signal;
- retransforming the filtered Fourier transformed signal to obtain a filtered signal;
- deriving the property on the basis of the filtered signal; and
- correcting the detected signal for a non-linearity to obtain a corrected first signal.

35. The method of claim 34, wherein that step of correcting the detected signal for a non-linearity to obtain a corrected first signal comprises:
- using a first initial coherent light beam;
- changing a first initial property of the first initial coherent light beam;
- coupling the first initial coherent light beam to the device under test;
- detecting a first signal of the first initial coherent light beam received from the device under test; and
- correcting a non-linearity in the first signal caused by a non-linearity in the change of the first initial property by interpolating the first signal on a linear scale.

36. A software program or product for executing a method for determining a property of an optical device under test, when run on a data processing system, the method comprising:
- program instructions for using a first initial coherent light beam;
- program instructions for changing a first initial property of the first initial coherent light beam;
- coupling the first initial coherent light beam to the device under test,
- program instructions for detecting a first signal of the first initial coherent light beam received from the device under test; and
- program instructions for correcting a non-linearity in the first signal caused by a non-linearity in a change of the first initial property by interpolating the first signal on a linear scale.

* * * * *